United States Patent
Schoellhammer et al.

(10) Patent No.: US 10,619,725 B2
(45) Date of Patent: Apr. 14, 2020

(54) INTERMEDIATE PLATE AND CONTROL UNIT

(71) Applicant: ElringKlinger AG, Dettingen (DE)

(72) Inventors: Jochen Schoellhammer, Dettingen (DE); Thomas Anhorn, Dettingen (DE); Klaus Detmann, Walluf (DE); Viktor Winkovic, Buchloe (DE)

(73) Assignee: ElringKlinger AG, Dettingen (DE)

( * ) Notice: Subject to any disclaimer, the term of this patent is extended or adjusted under 35 U.S.C. 154(b) by 783 days.

(21) Appl. No.: 15/078,730

(22) Filed: Mar. 23, 2016

(65) Prior Publication Data

US 2016/0273649 A1 Sep. 22, 2016

Related U.S. Application Data

(63) Continuation of application No. PCT/EP2014/069301, filed on Sep. 10, 2014.

(30) Foreign Application Priority Data

Sep. 25, 2013 (DE) ........................ 10 2013 219 300

(51) Int. Cl.
*F16H 61/00* (2006.01)
*F16H 61/02* (2006.01)

(52) U.S. Cl.
CPC ..... *F16H 61/0009* (2013.01); *F16H 61/0265* (2013.01)

(58) Field of Classification Search
CPC ... F16H 61/0009; F16H 61/0265; F16J 15/10; F16J 15/102; F16J 15/12; F16J 15/121; F16J 15/122
See application file for complete search history.

(56) References Cited

U.S. PATENT DOCUMENTS 3,679,218 A 7/1972 Farnam
3,930,656 A * 1/1976 Jelinek ..................... F02F 11/00
 277/611

(Continued)

FOREIGN PATENT DOCUMENTS

CN 102251997 A 11/2011
DE 197 02 382 A1 11/1997
(Continued)

*Primary Examiner* — Eugene G Byrd
(74) *Attorney, Agent, or Firm* — Reinhart Boerner Van Deuren P.C.

(57) ABSTRACT

In order to improve an intermediate plate for mounting between housing parts of a fluid-operated control unit, in particular a transmission unit, comprising a central unit of plate-shaped configuration and, on both sides of the central unit, a sealing system for sealing between the central unit and the housing part opposite thereto in each case, said sealing system comprising sealing elements arranged on the respective side of the central unit and extending around cutouts, in such a way that said intermediate plate allows complex fluid routing, it is proposed that the central unit comprise a fluid routing plate extending in a plate plane and having at least one fluid routing channel extending in the plate plane and comprise cover plates arranged on both sides of the fluid routing plate and having cutouts as accesses to the at least one fluid routing channel, that an intermediate sealing system sealing the at least one fluid routing channel be provided between the respective cover plate and the fluid routing plate and that the respective cover plate carry the respective sealing system for sealing between the central unit and the respective housing part.

29 Claims, 7 Drawing Sheets

(56) References Cited

U.S. PATENT DOCUMENTS

| | | | |
|---|---|---|---|
| 4,449,426 A | | 5/1984 | Younger |
| 5,322,299 A | * | 6/1994 | Terai .................... F16J 15/0818 277/596 |
| 5,582,415 A | * | 12/1996 | Yoshida ............... F16J 15/0825 277/592 |
| 5,947,482 A | * | 9/1999 | Iwata .................... F16J 15/122 277/592 |
| 6,070,882 A | | 6/2000 | Abe et al. |
| 6,073,938 A | * | 6/2000 | Abe ....................... F16J 15/104 277/644 |
| 6,478,306 B1 | * | 11/2002 | Kobayashi ............. F16J 15/122 277/592 |
| 7,878,769 B1 | | 2/2011 | Warnke et al. |
| 9,835,246 B2 | * | 12/2017 | Blersch ............... F16H 61/0009 |
| 2006/0232017 A1 | | 10/2006 | Hamada et al. |
| 2007/0262535 A1 | | 11/2007 | Imai |
| 2008/0211197 A1 | | 9/2008 | Abe et al. |
| 2008/0309027 A1 | | 12/2008 | Rogeon et al. |
| 2009/0247343 A1 | * | 10/2009 | Hart ......................... F16H 3/66 475/31 |
| 2009/0302551 A1 | | 12/2009 | Salameh |
| 2011/0054106 A1 | | 3/2011 | Sano |
| 2011/0168930 A1 | | 7/2011 | Tomoda et al. |
| 2013/0228984 A1 | * | 9/2013 | Watanabe .............. F16J 15/104 277/654 |
| 2014/0217678 A1 | | 8/2014 | Egloff et al. |
| 2016/0273655 A1 | | 9/2016 | Schoellhammer et al. |

FOREIGN PATENT DOCUMENTS

| | | |
|---|---|---|
| DE | 695 09 746 T2 | 9/1999 |
| DE | 10 2007 019 946 A1 | 10/2008 |
| DE | 10 2009 008 019 B3 | 11/2010 |
| DE | 10 2009 031 208 A1 | 1/2011 |
| DE | 10 2010 019 307 A1 | 11/2011 |
| DE | 20 2009 018 646 U1 | 7/2012 |
| DE | 20 2011 103 429 U1 | 9/2012 |
| DE | 10 2012 202 759 A1 | 8/2013 |
| EP | 0 417 494 A2 | 3/1991 |
| EP | 0733833 A1 | 9/1996 |
| EP | 2 072 818 A1 | 6/2009 |
| FR | 2 961 574 A1 | 12/2011 |
| JP | 61-177246 U1 | 11/1986 |
| JP | 62-046054 A | 2/1987 |
| JP | H09-210209 A | 8/1997 |
| JP | 2004-270758 A | 9/2004 |
| JP | 2007-303603 A | 11/2007 |
| JP | 2007-303606 A | 11/2007 |
| WO | WO 2010/072402 A1 | 7/2010 |
| WO | WO 2013/011132 A1 | 1/2013 |

\* cited by examiner

INTERMEDIATE PLATE AND CONTROL UNIT

CROSS-REFERENCE TO RELATED PATENT APPLICATIONS

This application is a continuation of International application No. PCT/EP2014/069301 filed on Sep. 10, 2014.

This patent application claims the benefit of International application No. PCT/EP2014/069301 of Sep. 10, 2014 and German application number 10 2013 219 300.9 of Sep. 25, 2013, the teachings and disclosure of which are hereby incorporated in their entirety by reference thereto.

BACKGROUND OF THE INVENTION

The invention relates to an intermediate plate for mounting between housing parts of a fluid-operated control unit, in particular a transmission unit, comprising a central unit of plate-shaped configuration and, on both sides of the central unit, a sealing system for sealing between the central unit and the housing part opposite thereto in each case, said sealing system comprising sealing elements arranged on the respective side of the central unit and extending around cutouts.

Such intermediate plates are known in the prior art, wherein these intermediate plates only allow for the fluid to be routed therethrough in a direction that is transverse, i.e. perpendicular, to the intermediate plate.

However, with these intermediate plates, there is a need not only for routing the fluid through the intermediate plate in the transverse direction thereto but also for possibly realizing more complex paths for the fluid.

Therefore, the object underlying the invention is to improve an intermediate plate of the generic type in such a manner that it allows complex fluid routing.

SUMMARY OF THE INVENTION

In accordance with the invention, this object is accomplished in an intermediate plate of the type described at the outset in that the central unit comprises a fluid routing plate extending in a plate plane and having at least one fluid routing channel extending in the plate plane and comprises cover plates arranged on both sides of the fluid routing plate and having cutouts as accesses to the at least one fluid routing channel, in that an intermediate sealing system sealing the at least one fluid routing channel is provided between the respective cover plate and the fluid routing plate and in that the respective cover plate carries the respective sealing system for sealing between the central unit and the respective housing part.

The advantage of the solution in accordance with the invention is that the fluid routing plate provides a way of realizing complex paths for the fluid in the plate plane, wherein these paths can be covered, and hence sealed off, by the two cover plates arranged on both sides of the fluid routing plate and in particular wherein the cover plates enable a stable base for the sealing towards the housing parts.

Preferably, the intermediate sealing system behaves elastically deformable in height in order to seal spacing tolerances between the fluid routing plate and the cover plates.

In order for such a central unit to be capable of being produced as cost-effectively as possible and also with durability in terms of its compressive strength, it is preferably provided that the intermediate sealing element, in addition to the sealing effect thereof, connects the fluid routing plate to the respective cover plate through an adhesive effect thereof.

Such an adhesive effect is of great advantage in that it enables a permanent connection between the fluid routing plate and the cover plates to be realized, said connection imparting the stability needed on the one hand and the tightness required on the other hand.

In particular, provision is made for the intermediate sealing element to behave elastically deformable in height in addition to its adhesive effect.

Furthermore, it is advantageously provided for sealing elements of the intermediate sealing system to cooperate adhesively both with the fluid routing plate and the respective cover plate, thereby enabling the sealing and the adhesive bonding between the fluid routing plate and the cover plates to be realized by one element.

In particular, the at least one fluid routing channel is configured as a groove open at one side or as a cutout extending through the fluid routing plate and being open at both sides, said cutout being closed off by the cover plates and extending from one access provided in at least one of the cover plates to another access provided in at least one of the cover plates.

Preferably, provision is made for sealing elements of the intermediate sealing system to extend at a distance of 2 mm or less from the edges of the at least one fluid routing channel in order to enable as compact as possible a construction of the central unit to be realized.

Furthermore, provision is made for the intermediate sealing system to comprise sealing elements extending around the at least one fluid routing channel in the fluid routing plate.

Furthermore, an advantageous solution provides for the sealing elements to extend around the at least one fluid routing channel in the fluid routing plate and around the cutouts in the cover plates and/or the fluid routing plate.

The sealing elements can be configured as surface seals or as line seals.

With line seals, it is possible for a sealing action to be realized in a particularly effective manner.

For example, the sealing created by the intermediate sealing system can be realized by use of an adhesive compound.

A particularly advantageous solution provides for the intermediate sealing system to comprise sealing elements of elastomeric material arranged between the fluid routing plate and the respective cover plate.

It is particularly advantageous for the elastomeric material to also have an adhesive effect, thereby adhesively bonding the fluid routing plate to the respective cover plate, in addition to sealing therebetween.

Moreover, the provision of an elastomeric material having an adhering or adhesive effect has the advantage that, when in assembled relationship, the elastomeric material forms a firm connection with both the elastomeric material-carrying part of the intermediate plate and the other part of the intermediate plate, whereby relative movements between the parts, in particular in directions parallel to a plane of extension of the intermediate plate, do not lead to friction of the elastomer-contacting part upon the elastomer and consequent damage to the elastomer layer over time but rather to shear movements inside the elastomer layer, which are of much less damaging nature, so that improved fatigue resistance of the sealing elements made of elastomeric material can be achieved.

The elastomeric material could be a silicone material, for example.

However, it is particularly advantageous for the elastomeric material to comprise a partially polymerized rubber material which additionally has an adhesive effect, imparted thereto through the partial polymerization process.

Advantageously, the rubber material has a degree of polymerization in the range between 15% or more and 90% or less.

The elastomeric material is in particular a fluoropolymer rubber.

No further details have as yet been given concerning the thickness of the layers.

Preferably, the layer of elastomeric material has a thickness of 5 µm or more, more preferably 10 µm or more, and even more preferably 15 µm or more.

Advantageously, the thickness is limited to 100 µm or less, more preferably 50 µm or less, even more preferably 30 µm or less.

The elastomeric material may be applied over the entire surface.

It is, however, also possible for the elastomeric material to be applied as a partially localized layer.

It is particularly advantageous for the elastomeric material to exhibit an adhesive effect which, when the cover plate is separated from the fluid routing plate, results in a peel stress of 0.1 kPa or more, where the relevant surface area is the total surface area over which the cover plate and the fluid routing plate extend in their overlap region.

Such application of the elastomeric material can be accomplished in a variety of ways.

One advantageous solution provides for the application of the elastomeric material to the respective plate to be by rolling or by screen printing techniques.

Applying the elastomeric material in such a way enables the sealing element to be produced in a particularly simple manner.

Furthermore, it is preferably provided for the intermediate sealing system to comprise, as the sealing element, linear elastomer strips arranged on the respective plate, i.e. the fluid routing plate and/or the cover plates.

As an alternative to this, an advantageous solution provides for the cover plates and the fluid routing plate to have arranged therebetween sealing layers having sealing beads integrally formed therein as the sealing elements and forming the intermediate sealing systems.

This solution allows a sealing engagement between the fluid routing plate and the cover plates to be achieved, in particular because of the sealing beads' advantageous capability for elastic deformation in height, optionally wherein the sealing beads of the sealing elements may also be coated with elastomeric material for microsealing.

In conjunction with the description of the solution in accordance with the invention, no details have been provided so far as to the properties of the cover plates and the fluid routing plates.

In particular in instances where the complex fluid routing channels are to be realized by grooves which are open on one side or by cutouts which are open on both sides, provided in the fluid routing plate, there exists a need for the cover plates to have sufficient stiffness in order that they may, in turn, be able to make available sufficient sealing compression to the sealing system.

For this reason, provision is preferably made for the cover plates to exhibit a stiffness such that their deflection over a distance of 10 mm when subjected to a surface load from a fluid pressure of 50 bar is 100 µm or less, preferably 50 µm or less, more preferably 30 µm or less and optimally 20 µm or less.

Thus, for the design of the sealing system between the central unit and the respective housing part, defined conditions for the support of the sealing system by the central unit may be assumed.

Such a stiffness of the cover plates can be easily realized by the cover plates being made of steel.

In this case, the cover plates preferably have a thickness in the range between 0.5 mm or more and 2 mm or less in order for them to exhibit sufficient stability.

As an alternative to this, it is provided for the cover plates to be made of aluminium or aluminium alloys.

In this instance, it is advantageous for the cover plates to have a thickness in the range between 1 mm or more and 2 mm or less.

Also preferably, a modulus of elasticity of the cover plates is predetermined.

Advantageously, the modulus of elasticity of the cover plates is in the range of 70 GPa or more and 210 GPa or less.

In order to be able to compensate for deformations both of the housing parts and the central unit, it is preferably provided for the cover plates to comprise on the side thereof facing towards the respective housing part material accumulations for forming the sealing system.

Such material accumulations are preferably configured such that they represent height profiling, wherein the height profiling may vary, for example corresponding to the distance between bolting points, and hence need not be constant.

It is thus possible to compensate in advance for deformations both of the housing parts and the central unit, in particular of the cover plates.

Preferably, the material accumulations are configured in a rear side neutral manner.

It is particularly advantageous for the material accumulations to have resulted from reshaping the cover plates, meaning that such reshaping may comprise compressing or embossing the cover plates.

No further details have as yet been given concerning the sealing system between the central unit and the housing parts.

Thus, an advantageous solution provides for the sealing system to comprise, as the sealing element, an elastomeric material arranged on the respective cover plate.

That is, this elastomeric material may be arranged on a planar surface of the respective cover plate.

It is, however, also possible for the sealing element to be arranged on a material accumulation such as described above so that the possibility exists for compensating for deflections of the housing parts and the central unit.

Such an elastomeric material may be applied in a variety of ways, for example over a surface area or in a structured pattern.

A particularly cost-effective solution provides for the elastomeric material to be applied to the respective cover plate by rolling or screen printing techniques.

In particular, a simple way to apply the elastomeric material as the sealing element is for the sealing system to comprise, as the sealing element, areas and/or linear strips of elastomeric material arranged on the cover plate.

Here, the elastomeric material may be configured in the same way and have the same adhesive effect and the same thickness as described in connection with the elastomeric material for the intermediate sealing system.

As an alternative or in addition to the provision of elastomeric material, another solution provides for the cover plates to have arranged thereon sealing layers having sealing beads integrally formed therein as the sealing elements and forming the sealing system.

A sealing system having sealing beads affords the possibility of elastically compensating for variations in the deflection of the housing parts and/or the central unit in an advantageous manner.

Here, such sealing beads may also be combined with elastomeric material for microsealing.

However, such sealing beads may also be combined with material accumulations in order to compensate, for example, for significant deflections of the housing parts or the central unit.

Furthermore, the invention provides for the cover plates and the fluid routing plate each to be made of materials having coefficients of thermal expansion differing at most by 20%, more preferably at most by 10%.

Such a choice of materials for the cover plates and the fluid routing plate has the advantage that it provides a simple way of realizing the sealing action between the two without encountering significant problems due to the differences in thermal expansion therebetween.

A particularly simple way is to make the cover plates and the fluid routing plate of identical materials.

It is preferred for the cover plates and the fluid routing plate to be made of aluminium with a view to ensuring a lightweight construction.

Further features and advantages of the invention are the subject-matter of the following description and drawings of a number of exemplary embodiments.

DETAILED DESCRIPTION OF THE INVENTION

Figure 1:
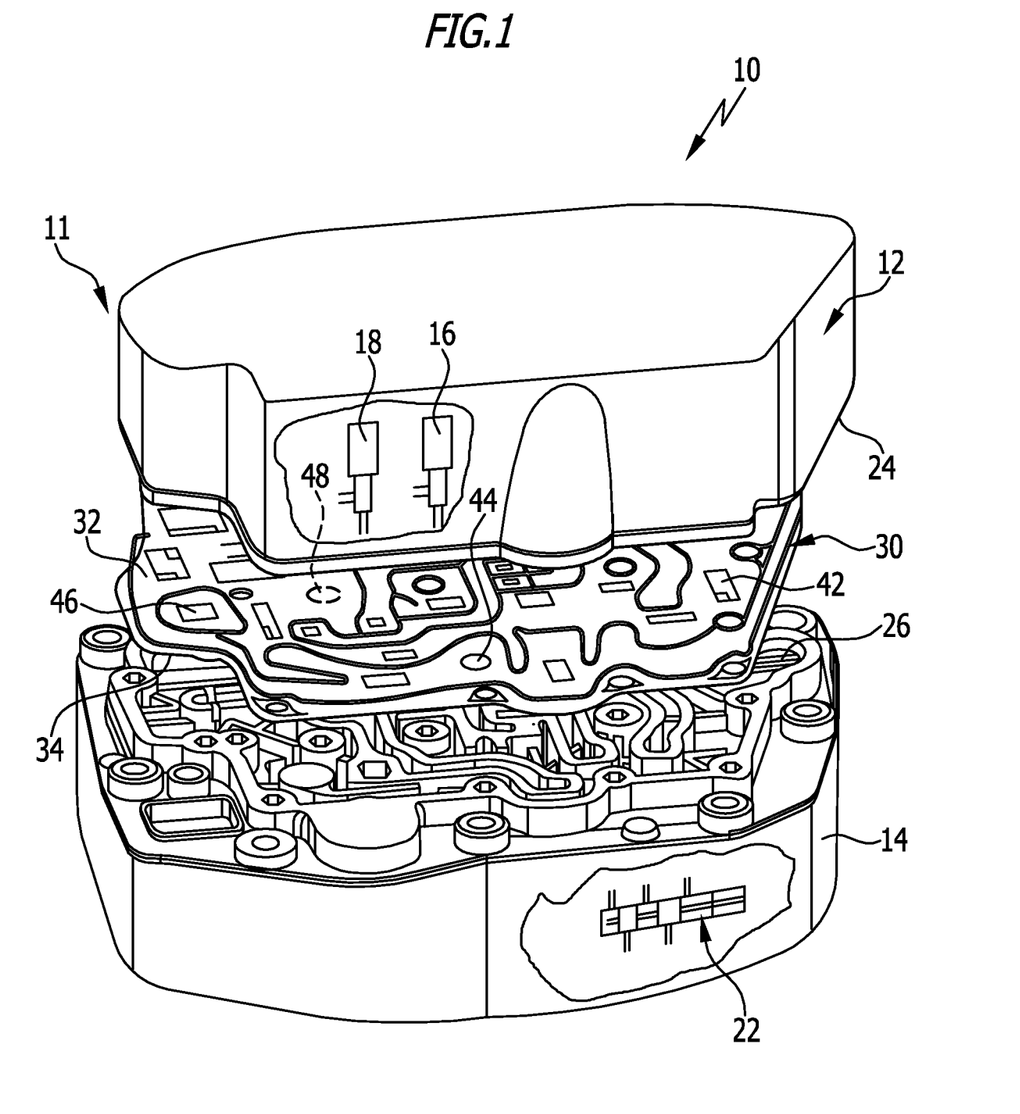
FIG. 1 depicts a schematic exploded view of two housing parts, partly broken open, of a control unit and a schematic representation of an intermediate plate interposed between these housing parts.

As schematically illustrated in FIG. 1 and designated therein in its entirety by the reference numeral 10, a fluid-operated control unit, for example for use in a fluid-operated transmission unit, in particular a transmission unit for motor vehicles, comprises a control housing 11 formed of a first housing part 12, in particular made of metal, and a second housing part 14, in particular made of metal, of which the first housing part comprises for examples valves 16, 18 and the second housing part 14 comprises for example a slider 22, wherein these in each case control a flow of fluid in the respective housing part 12, 14.

The two housing parts 12, 14 have channel sides 24 and 26 facing each other, said channel sides 24, 26 being configured in such a way that the fluid can pass from one of the housing parts 12, 14 into the other of the housing parts 14, 12.

Interposed between said channel sides 24 and 26 of the housing parts 12, 14 is an intermediate plate, designated in its entirety by the reference numeral 30, said intermediate plate 30 at a first side 32 thereof being in contact against the channel side 24 of the first housing part 12 and at a second side 34 thereof being in contact against the channel side 26 of the second housing part 14 and being in each case in sealing engagement with said channel sides 24, 26, wherein the intermediate plate 30 has provided therein passageways, such as passageways 42, 44 and possibly other passageways, through which the fluid passes from one housing part 12, 14 into the other housing part 14, 12.

Here, some of the passageways, such as the passageway 42, permit unrestricted flow of fluid from one of the housing parts 12, 14 into the other housing part 14, 12; in addition thereto, some of the passageways, such as the passageway 44, serve as a restrictor for restricting the flow of fluid from one of the housing parts 12, 14 into the other housing part 14, 12, wherein by way of such a passageway a specific and adaptable restricting effect for controlling sequences, in particular timing sequences during shifts, can be achieved.

Furthermore, the intermediate plate 30 also serves to receive fluid via an inlet 46 facing towards the channel side 24, route it over a distance in a plane of the intermediate plate 30 and let it exit at an outlet 48 facing towards the channel side 26.

Figure 2:
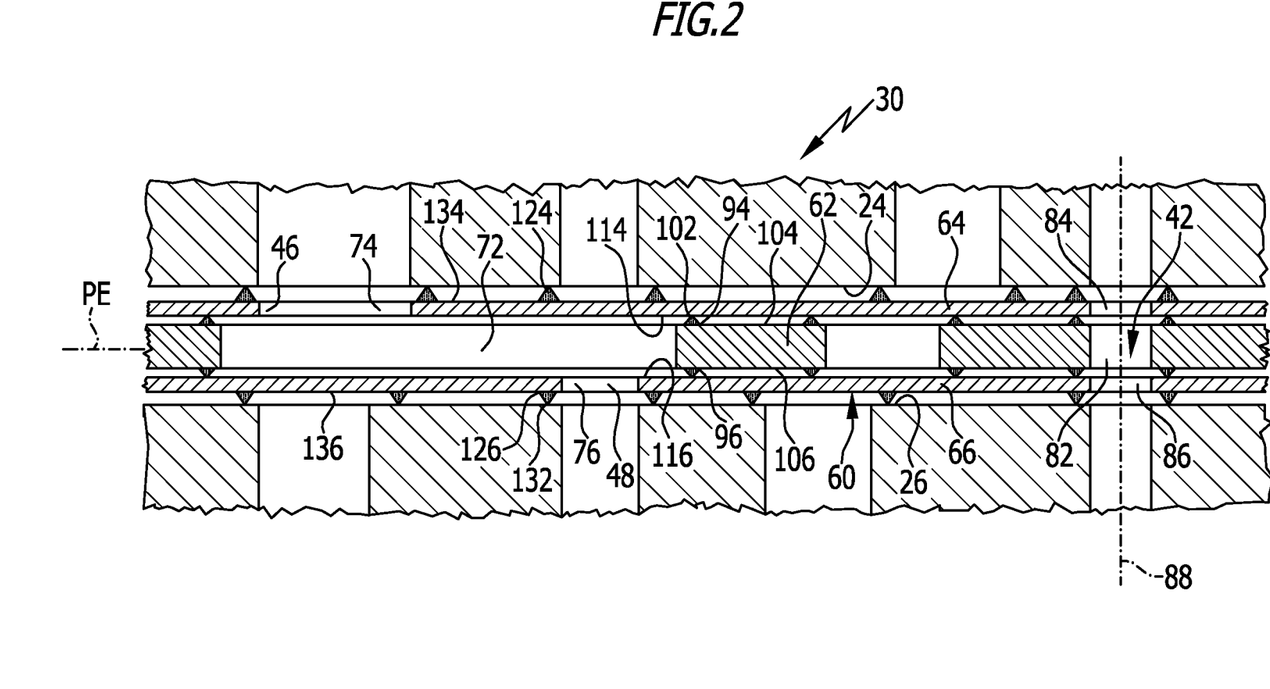
FIG. 2 is a detail view, at an enlarged scale, of the housing parts, illustrating how they are in contact against a first exemplary embodiment of the intermediate plate when the control unit is in the assembled condition.

As depicted in FIG. 2, the intermediate plate 30 comprises a central unit, designated in its entirety by the reference numeral 60, said central unit 60 being in turn formed from a fluid routing plate 62 extending in a plate plane PE, and cover plates 64, 66 arranged on both sides of the fluid routing plate.

The fluid routing plate 62 is provided with at least one fluid routing channel 72 which, in the form of a cutout that passes through the fluid routing plate 62 and is open on both sides, extends in the plate plane PE in such a manner that it connects the inlet 46 formed by a cutout 74 in the cover plate 64 to an outlet 48 formed by a cutout 76 in the cover plate 66 so that the inlet 46 can be arranged in offset relation to the outlet 48 in a direction of the plate plane PE.

The fluid routing channel 72 is closed off by the cover plates 64 and 66 and, consequently, access to the fluid routing channel 72 is only via the cutout 74 and the cutout 76.

Furthermore, it is preferred for the central unit 60 to be configured such that it also forms the passageway 42, which in turn is formed by a cutout 82 in the fluid routing plate and a cutout 84 in the cover plate 64 aligned with the cutout 82 and a cutout 86 in the cover plate 66 aligned with the cutout 82, whereby the cutouts 82, 84, 86 are all ultimately arranged coaxially to a central axis 88 which preferably runs perpendicularly to the plate plane PE.

To seal between the fluid routing plate 62 and the two cover plates 64 and 66, an intermediate sealing system 94 and 96 is in each case provided between the fluid routing plate 62 and the respective cover plate 64 and 66, wherein the intermediate sealing systems 94, 96 in the first exemplary embodiment comprise sealing elements 102 that have linear extension, said sealing elements 102 being arranged for example on surfaces 104 and 106 facing towards the cover plates 64 and 66 respectively and cooperating with corresponding surfaces 114 and 116 respectively of the respective cover plate 64 and 66, in order to provide for fluid-tight closure around the at least one fluid channel 72 and the respective cutouts 82 and 84 and 86.

In the first exemplary embodiment, shown in FIG. 2, of the intermediate plate 30 constructed in accordance with the invention, the intermediate sealing systems 94 and 96 are configured such that the sealing elements 102 thereof are made of elastomeric material and are applied to the surfaces 104 and 106 and/or the surfaces 114 and 116.

Here, the elastomeric material of the sealing elements 102 is preferably configured such that the sealing elements 102, in addition to their behaving elastically deformable in height, will effect an adhesive bond between the fluid routing plate 62 and the cover plates 64, 66.

Furthermore, the cover plates 64 and 66 themselves carry sealing systems 124, 126 which likewise comprise sealing elements 132 of elastomeric material, said sealing elements 132 being arranged on surfaces 134, 136 of the cover plates 64, 66 facing towards the channel sides 24 and 26 respectively and effecting a tight seal between the respective cover plate 64 and 66 and the respective channel side 24 and 26 of the corresponding housing part 12 and 14.

Preferably, these sealing elements 132 are also made of elastomeric material which is applied and fixed to the surfaces 134 and 136 by a screen printing process for example.

In this case, the elastomeric material may also be advantageously configured such that in addition to its behaving elastically deformable in height with the channel sides 24, 26, it is capable of being brought into an adhering or adhesive engagement therewith so that, when the control unit is in the assembled condition, the elastomeric material provides an adhesive bond between the respective cover plate 64 and 66 and the corresponding channel side 24 and 26 of the housing parts 12 and 14 respectively.

Thus, on the one hand, the intermediate plate 30 constructed in accordance with the invention provides for seal-tight engagement thereof with the respective channel sides 24 and 26, and on the other hand the intermediate plate 30 opens up the possibility of routing the pressure medium in the plate plane PE of the fluid routing plate 62 through the at least one fluid channel 72, thereby giving more flexibility to the design in the area of the housing parts 12, 14.

Providing an elastomeric material that has an adhering or adhesive effect is advantageous in that, when in assembled relationship, the elastomeric material forms a firm connection with both the elastomer material-carrying part of the intermediate plate and the part against which the elastomeric material is in contact, whereby relative movements between the parts, in particular in directions parallel to a plane of extension of the intermediate plate, do not lead to friction of the elastomer-contacting part upon the elastomer and consequent damage to the elastomer layer over time but rather to shear movements inside the elastomer layer, which are of much less damaging nature, so that improved fatigue resistance of the sealing elements made of elastomeric material can be achieved.

In particular, the elastomeric material for both the sealing elements 103 and the sealing elements 133 is configured such that it comprises a partially polymerized rubber material, wherein the rubber material has a degree of polymerization in the range between 15% or more and 90% or less.

The elastomeric material is preferably a fluoropolymer rubber.

By way of example, the elastomeric material exhibits an adhesive effect which, when the cover plate 64, 66 is separated from the fluid routing plate 62, results in a peel stress of 0.1 kPa or more, where the relevant surface area is the total surface area over which the cover plate and the fluid routing plate extend in the overlap region, i.e. including the surface area of the cutouts.

Preferably, the thickness of the layer of the elastomeric material is in the range between 5 µm or more and 100 µm or less.

The elastomeric material may be applied over the entire surface; it is, however, also possible for elastomeric material to be applied as a partially localized layer.

No details have been given so far as to how the fluid routing plate 62 and the cover plates 64, 66 are configured.

Thus, it is preferably provided for the fluid routing plate 62 to be made of aluminium.

In addition thereto, the cover plates 64, 66 may likewise be made of aluminium or they may be made of steel.

However, an essential parameter in achieving a reliable seal between the respective cover plates 64 and 66 and the respective channel sides 24 and 26 of the housing parts 12, 14 is that the cover plates exhibit a stiffness such that their deflection over a distance of 10 mm when subjected to a surface load from a fluid pressure of 50 bar is 100 µm or less, preferably 50 µm or less, more preferably 30 µm or less and optimally 20 µm or less, at the above-mentioned fluid pressure, in order to achieve a safe sealing condition with the respective channel side 24, 26 even when the respective cover plate 64, 66 in a portion thereof carrying a sealing element 132 is not supported directly by the fluid routing plate 62.

Such a stiffness of the cover plates 64, 66 opens up a large enough number of degrees of freedom with respect to the configuration of the fluid routing plate 62, in particular the formation thereof with fluid routing channels 72, without it being necessary in each case for the cover plates 64, 66 to be supported in the portions thereof provided with the sealing elements 132 by the fluid routing plate 62 directly or at a small distance therefrom.

For example, where the cover plates 64, 66 are formed of steel, the cover plates 64, 66 may have a thickness between 0.5 mm or more and 0.8 mm or less.

It is, however, also possible for the cover plates 64, 66 to be made of aluminium.

In this case, the cover plates 64, 66 have a thickness in the range between 1 mm or more and 2 mm or less.

Preferably, the cover plates 64, 66 have a modulus of elasticity in the range between 70 GPa and 210 GPa.

Figure 3:
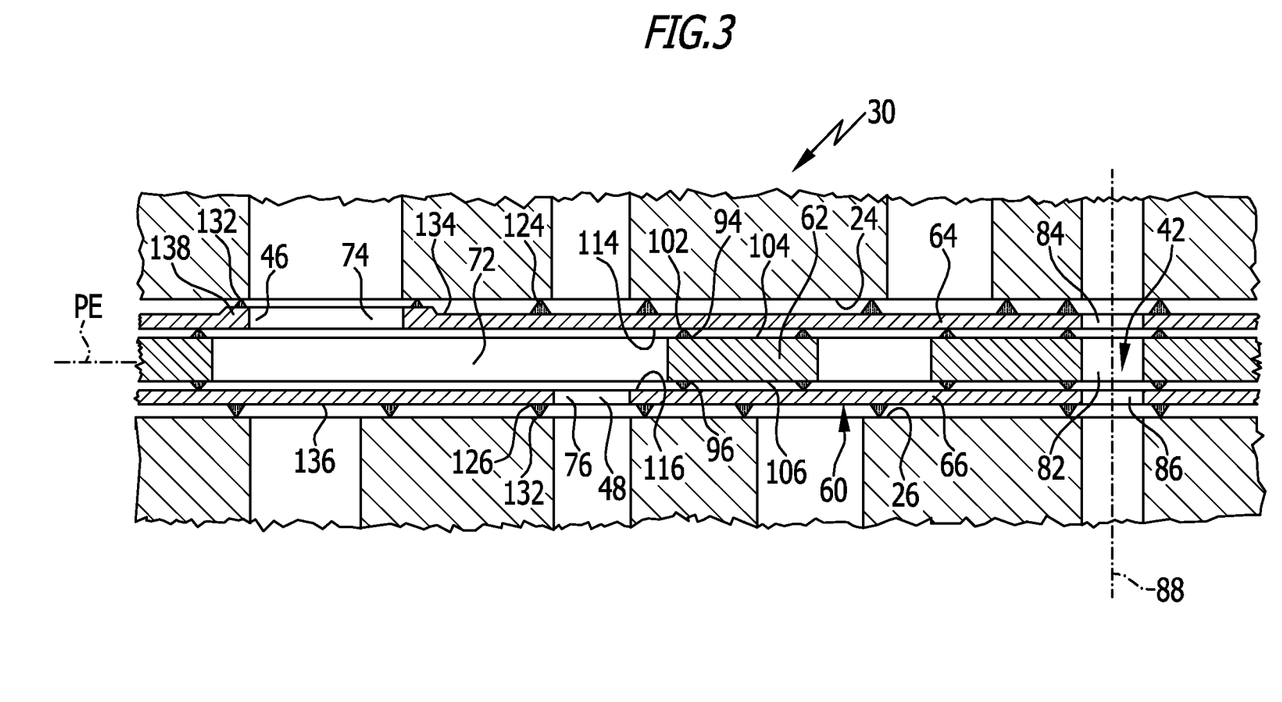
FIG. 3 is a detail view, at an enlarged scale, of the housing parts, illustrating how they are in contact against a second exemplary embodiment of the intermediate plate when the control unit is in the assembled condition.

In a second exemplary embodiment, illustrated in FIG. 3, elements which are identical to corresponding elements of the first exemplary embodiment are provided with the same reference characters and reference may be had to what has been stated with respect to the description of such elements in the first exemplary embodiment, the teachings of which are wholly incorporated herein by reference.

As contrasted to the first exemplary embodiment, the cover plates 64 and 66 present material accumulations 138 formed for example in the area around the cutout 74, said material accumulations 138 projecting beyond the surfaces 134 and 136 of the cover plates 64, 66 in order to achieve in these areas an increased compression for the sealing elements 132 made of elastomeric material or to compensate for deflection of the cover plates 64, 66 in a direction away from the channel sides 24 and 26 respectively.

Preferably, such material accumulations 138 are integrally formed in the cover plates 64, 66 in a manner that is neutral with respect to the rear side thereof, meaning that they have zero effect on the configuration of the sides of the cover plates 64, 66 that face towards the fluid routing plate 62.

Preferably, these material accumulations 138 are capable of being produced by reshaping the respective cover plates 64, 66, for example in the area surrounding the one cutout in each case, via material flow resulting for example from compression or embossing operations.

Figure 4:
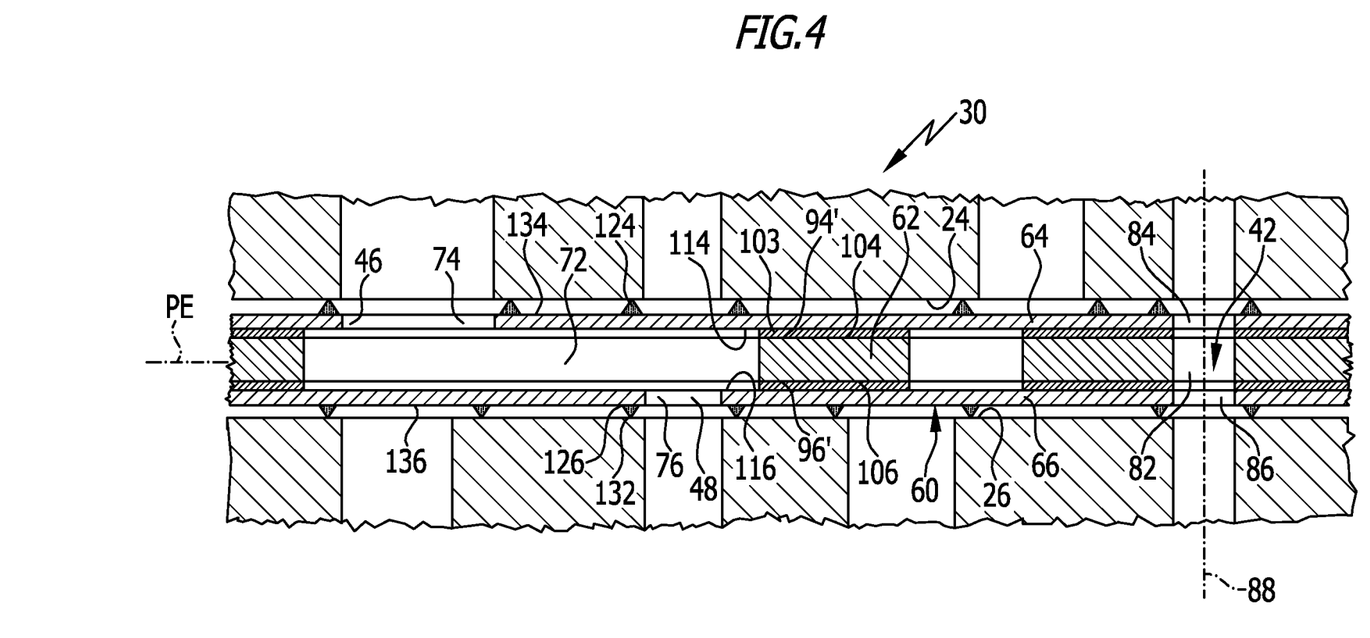
FIG. 4 is a detail view, at an enlarged scale, of the housing parts, illustrating how they are in contact against a third exemplary embodiment of the intermediate plate when the control unit is in the assembled condition.

In a third exemplary embodiment, illustrated in FIG. 4, elements which are identical to corresponding elements of the first exemplary embodiment are provided with the same reference characters and reference may be had to what has been stated with respect to the description of such elements in the first exemplary embodiment or in the second exemplary embodiment, the teachings of which are wholly incorporated herein by reference.

As contrasted to the first and second exemplary embodiments, the third exemplary embodiment has the intermediate sealing systems 94' and 96' configured such that they comprise sealing elements 103 that are applied over the entire surface of the fluid routing plate 62, said sealing elements 103 effecting a seal and an adhesive bond between the fluid routing plate 62 and the cover plates 64 and 66.

The sealing elements 103 in each case extend around the fluid channel 72 and around the respective cutouts 82 and 84 and 86 and form a fluid-tight seal.

The advantage of the surface sealing elements 103 is that with these, a more stable connection between the fluid routing plate 62 and the cover plates 64 and 66 can be established on the one hand and a reliable seal can be achieved on the other hand, this being likewise due to their being formed as large-area seals.

Figure 5:
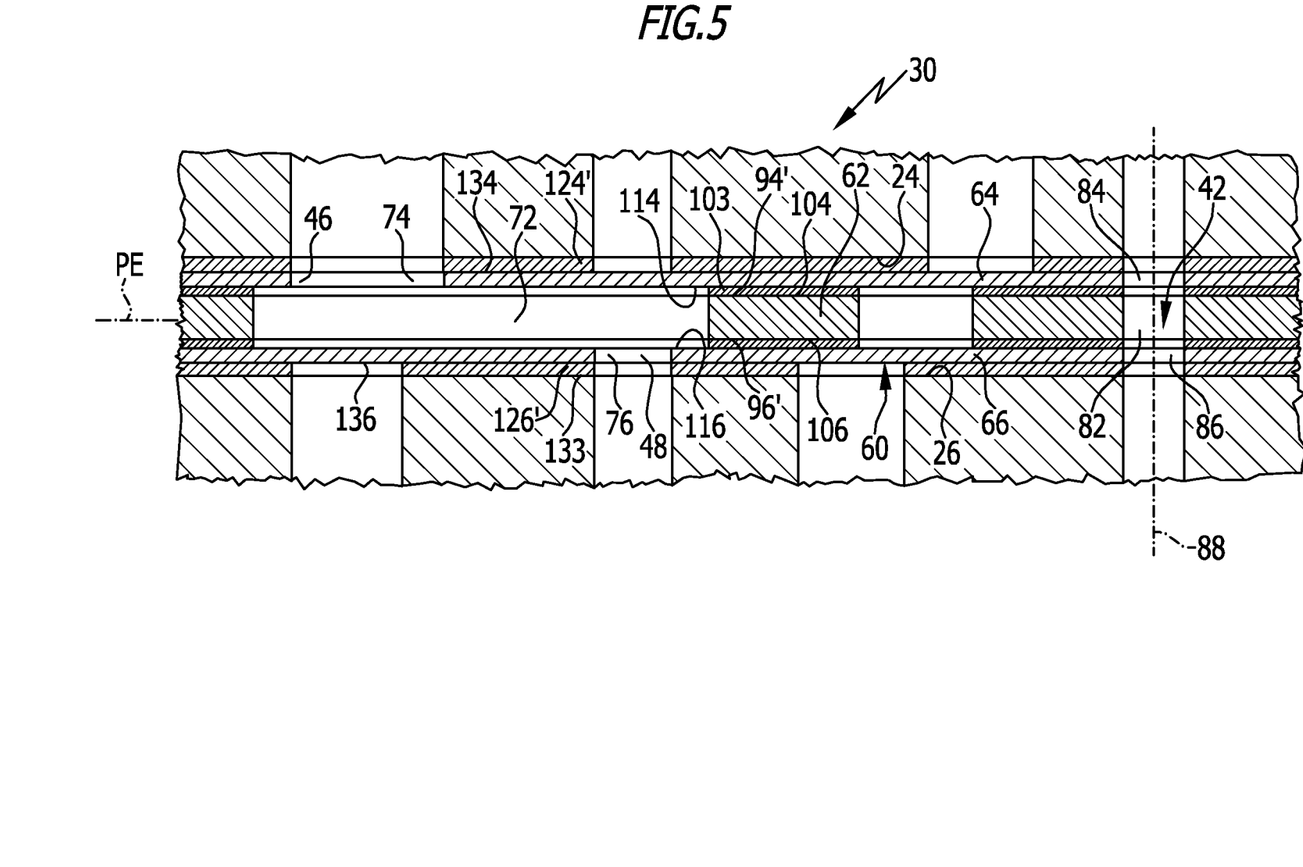
FIG. 5 is a detail view, at an enlarged scale, of the housing parts, illustrating how they are in contact against a fourth exemplary embodiment of the intermediate plate when the control unit is in the assembled condition.

In a fourth exemplary embodiment, illustrated in FIG. 5, elements which are identical to corresponding elements of the previous exemplary embodiments are provided with the same reference characters and reference may be had to what has been stated with respect to the description of such elements in the previous exemplary embodiments, the teachings of which are wholly incorporated herein by reference.

In addition to the intermediate sealing systems 94' and 96' being configured as surface sealing elements 103 as has been described in connection with the third exemplary embodiment, the fourth exemplary embodiment of FIG. 5 further provides for the sealing systems 124' and 126' likewise not to comprise linear sealing elements 132 but to likewise comprise surface sealing elements 133 which are arranged for example in such a way that they are applied to the cover plates 64 and 66 in the area of an overlap between the cover plates 64 and 66 and the channel sides 24 and 26 of the housing parts and are thus capable of being brought into an adhering or adhesive engagement with the channel sides 24, 26 when the housing part 12, 14 are assembled, thereby enabling a permanent connection between the channel sides 24 and 26 and the sealing elements 133 to be achieved.

Figure 6:
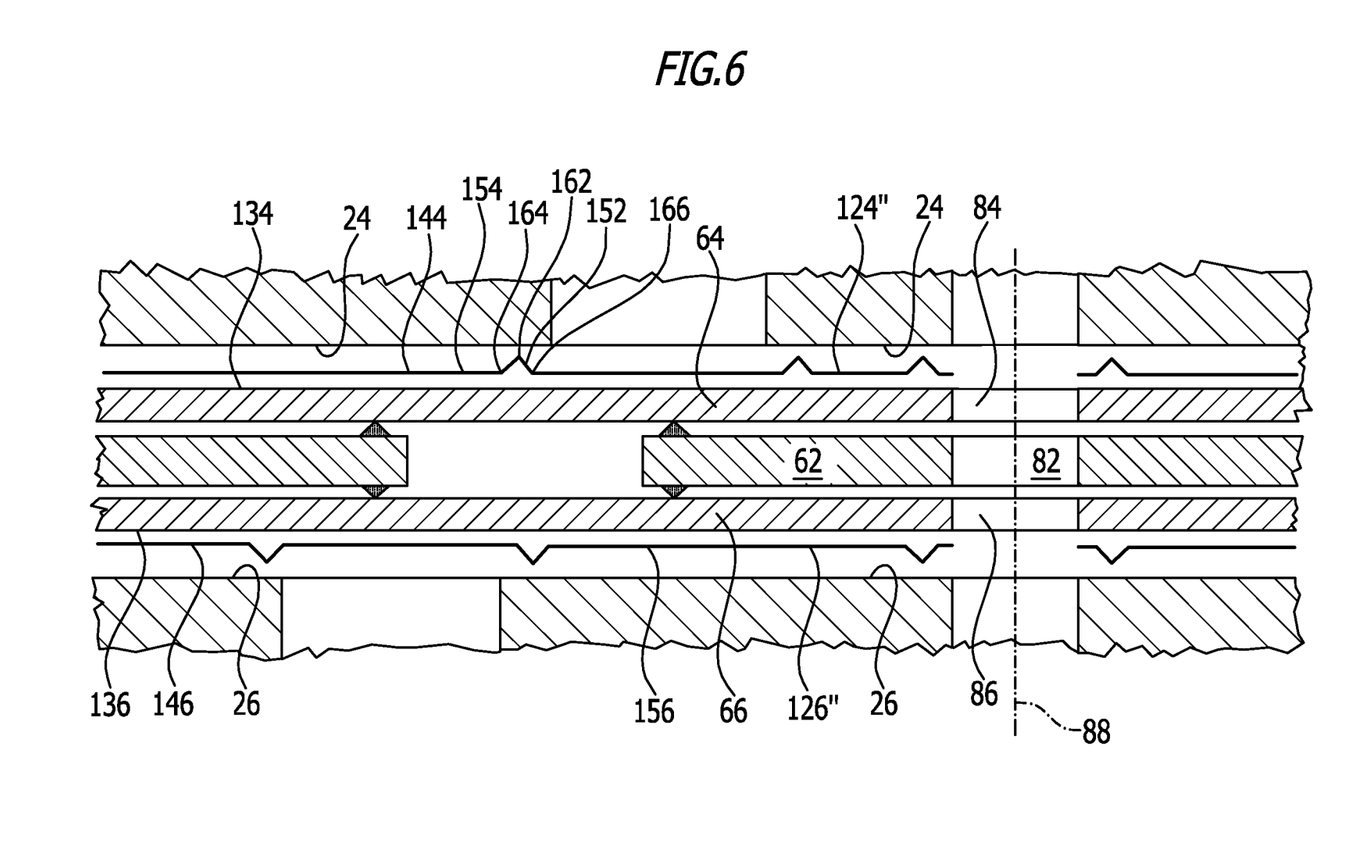
FIG. 6 is a detail view, at an enlarged scale, of the housing parts, illustrating how they are in contact against a fifth exemplary embodiment of the intermediate plate when the control unit is in the assembled condition.

In a fifth exemplary embodiment, depicted in FIG. 6, elements which are identical to corresponding elements of the previous exemplary embodiments are provided with the same reference characters and reference may be had to what has been stated with respect to the description of such elements in the previous exemplary embodiments, the teachings of which are wholly incorporated herein by reference.

As contrasted to these exemplary embodiments, the sealing systems 124" and 126" are not formed of the sealing elements 132 of elastomeric material, but rather the sealing systems 124" and 126" are formed by functional layers 144 and 146 having sealing beads 152 at the locations to be sealed, said sealing beads 152 being integrally formed in sealing layers 154, 156, wherein the sealing layers 154, 156 are for example made of a thin sheet of spring steel.

Preferably, the sealing beads 152 are integrally formed in the sealing layers 154, 156 such that they project beyond the sealing layers 154 and 156 in a direction of the channel sides 24 and 26 respectively and are therefore capable of having a bead crest 162 thereof brought into contact against the channel sides 24 and 26 respectively of the housing parts 12 and 14 respectively, while the bead roots 164, 166 of the beads 152 in each case are in contact against the surfaces 134 and 136 of the cover plates 64 and 66 respectively.

Other than that, parts which are identical to corresponding parts of the previous exemplary embodiments are provided with the same reference characters and reference may be had to what has been stated in connection with these exemplary embodiments, in particular in connection with FIG. 2, the teachings of which are wholly incorporated herein by reference.

Figure 7:
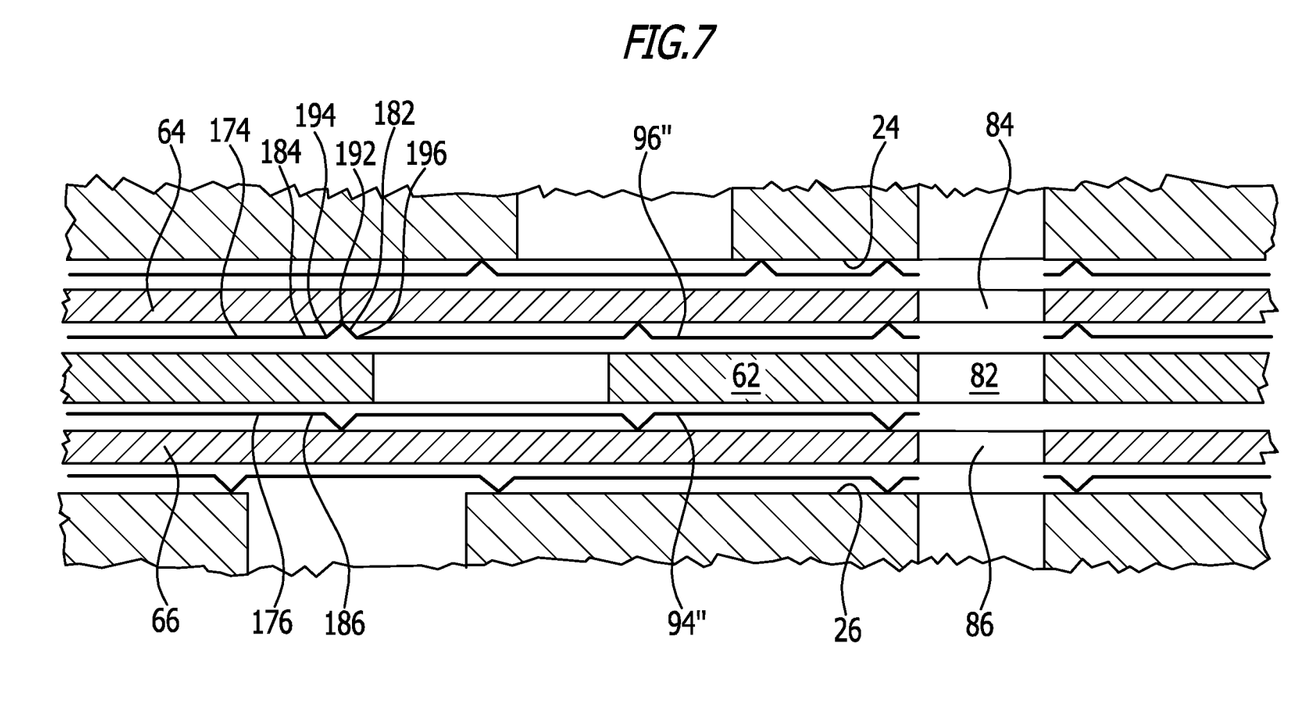
FIG. 7 is a detail view, at an enlarged scale, of the housing parts, illustrating how they are in contact against a sixth exemplary embodiment of the intermediate plate when the control unit is in the assembled condition.

In a sixth exemplary embodiment of an intermediate plate constructed in accordance with the invention, illustrated in FIG. 7, parts which are identical to corresponding parts of the previous exemplary embodiments are provided with the same reference characters and reference may be had to what has been stated with respect to the description of such parts in the previous exemplary embodiments, the teachings of which are wholly incorporated herein by reference.

As contrasted to the previous exemplary embodiments, the sixth exemplary embodiment also has the intermediate sealing systems 94" and 96" thereof formed by functional layers 174 and 176, said functional layers 174 and 176 comprising beads 182 which are integrally formed in sealing layers 184 and 186, preferably wherein the beads 182 are configured such that a bead crest 192 thereof faces towards and is in contact against the respective cover plates 64 and 66, while bead roots 194 and 196 of the beads 182 are in contact against the fluid routing plate 62.

Thus, in the sixth exemplary embodiment, both the intermediate sealing systems 94" and 96" and the sealing systems 124" and 126" are formed by metallic functional layers 144 and 146 respectively and 174 and 176 respectively.

The invention claimed is:

1. An intermediate plate for mounting between housing parts of a fluid-operated control unit, in particular a transmission unit, comprising a central unit of plate-shaped configuration and, on both sides of the central unit, a sealing system for sealing between the central unit and the housing part opposite thereto in each case, said sealing system comprising sealing elements arranged on the respective side of the central unit and extending around cutouts, the central unit comprises a fluid routing plate extending in a plate plane and having at least one fluid routing channel extending in the plate plane to provide a fluid connection along the plate plane, and comprises cover plates arranged on both sides of the fluid routing plate and having cutouts as accesses to the at least one fluid routing channel, the accesses to the at least one fluid routing channel being arranged in offset relation to each other in a direction of the plate plane, an intermediate sealing system sealing the at least one fluid routing channel is provided between the respective cover plate and the fluid routing plate and the respective cover plate carries the respective sealing system for sealing between the central unit and the respective housing part.

2. The intermediate late in accordance with claim 1, wherein an intermediate sealing element, in addition to the sealing effect thereof, connects the fluid routing plate to the respective cover plate through an adhesive effect thereof.

3. The intermediate plate in accordance with claim 1, wherein sealing elements of the intermediate sealing system cooperate adhesively both with the fluid routing plate and the respective cover plate.

4. The intermediate plate in accordance with claim 1, wherein sealing elements of the intermediate sealing system extend at a distance of 2 mm or less from the edges of the at least one fluid routing channel.

5. The intermediate plate in accordance with claim 1, wherein the intermediate sealing system comprises sealing elements extending around the at least one fluid routing channel in the fluid routing plate.

6. The intermediate plate in accordance with claim 5, wherein the sealing elements extend around the at least one fluid routing channel in the fluid routing plate and around the cutouts in the cover plates and/or the fluid routing plate.

7. The intermediate plate in accordance with claim 1, wherein the intermediate sealing system comprises sealing elements of elastomeric material arranged between the fluid routing plate and the respective cover plate.

8. The intermediate plate in accordance with claim 7, wherein the elastomeric material is applied to the respective plate by rolling or by screen printing.

9. The intermediate plate in accordance with claim 7, wherein the intermediate sealing system comprises, as the sealing element, linear elastomer strips arranged on the respective plate.

10. The intermediate plate in accordance with claim 1, wherein the cover plates and the fluid routing plate have arranged therebetween sealing layers having sealing beads integrally formed therein as the sealing elements and forming the intermediate sealing systems.

11. The intermediate plate in accordance with claim 1, wherein the cover plates exhibit a stiffness such that their deflection over a free distance of 10 mm when subjected to a surface load from a fluid pressure of 50 bar is 100 µm or less.

12. The intermediate plate in accordance with claim 1, wherein the cover plates are made of steel.

13. The intermediate plate in accordance with claim 12, wherein the cover plates have a thickness in the range between 0.5 mm or more and 2 mm or less.

14. The intermediate plate in accordance with claim 1, wherein the cover plates are made of aluminium or aluminium alloys.

15. The intermediate plate in accordance with claim 14, wherein the cover plates have a thickness in the range between 1 mm or more and 2 mm or less.

16. The intermediate plate in accordance with claim 1, wherein the cover plates have a modulus of elasticity in the range of 70 GPa or more to 210 GPa or less.

17. The intermediate plate in accordance with claim 1, wherein the cover plates comprise on the side thereof facing towards the respective housing part material accumulations for forming the sealing system.

18. The intermediate plate in accordance with claim 17, wherein the material accumulations are configured in a rear side-neutral manner.

19. The intermediate plate in accordance with claim 17, wherein the material accumulations have resulted from reshaping.

20. The intermediate plate in accordance with claim 1, wherein the sealing system comprises, as the sealing element, an elastomeric material arranged on the respective cover plate.

21. The intermediate plate in accordance with claim 20, wherein the elastomeric material is applied to the respective cover plate by screen printing.

22. The intermediate plate in accordance with claim 20, wherein the sealing system comprises, as the sealing element, areas and/or linear strips of elastomeric material arranged on the cover plate.

23. The intermediate plate in accordance with claim 1, wherein the cover plates have arranged thereon sealing layers having sealing beads integrally formed therein as the sealing elements and forming the sealing system.

24. The intermediate plate in accordance with claim 1, wherein the cover plates and the fluid routing plate are each made of materials having coefficients of thermal expansion differing at most by 20%, more preferably at most by 10%.

25. The intermediate plate in accordance with claim 1, wherein the cover plates and the fluid routing plate are made of identical materials.

26. The intermediate plate in accordance with claim 25, wherein the cover plates and the fluid routing plate are made of aluminium.

27. A fluid-operated transmission unit, comprising two housing parts and an intermediate plate arranged between the housing parts, wherein the intermediate plate is configured in accordance with claim 1.

28. The intermediate plate in accordance with claim 1, wherein the fluid routing channel comprises a groove in the fluid routing plate to route fluid from one location to another location, the groove being open on one side.

29. The intermediate plate in accordance with claim 28, wherein one of the cover plates seals the groove on the open side.

* * * * *